US010255613B1

(12) United States Patent
Schultz et al.

(10) Patent No.: US 10,255,613 B1
(45) Date of Patent: Apr. 9, 2019

(54) IDENTITY-RECOGNITION-BASED PROMOTIONS USING VIRTUAL CONTAINERS

(71) Applicant: KABAM INC., San Francisco, CA (US)

(72) Inventors: Stephanie K. Schultz, San Francisco, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 910 days.

(21) Appl. No.: 13/888,109

(22) Filed: May 6, 2013

(51) Int. Cl.
*G06Q 30/02* (2012.01)

(52) U.S. Cl.
CPC ................................. *G06Q 30/0209* (2013.01)

(58) Field of Classification Search
None
See application file for complete search history.

(56) References Cited

U.S. PATENT DOCUMENTS

| | | | |
|---|---|---|---|
| 7,682,239 B2 | 3/2010 | Friedman et al. | 463/16 |
| 8,777,754 B1 * | 7/2014 | Santini | G07F 17/32 463/42 |
| 2003/0102625 A1 | 6/2003 | Katz et al. | 273/138.1 |
| 2005/0137015 A1 * | 6/2005 | Rogers et al. | 463/42 |
| 2011/0112662 A1 * | 5/2011 | Thompson et al. | 700/91 |
| 2012/0101886 A1 * | 4/2012 | Subramanian | G06Q 30/0222 705/14.23 |
| 2014/0100020 A1 * | 4/2014 | Carroll et al. | 463/25 |

* cited by examiner

*Primary Examiner* — Rutao Wu
*Assistant Examiner* — Alfred H Tsui
(74) *Attorney, Agent, or Firm* — Sheppard Mullin Richter & Hampton LLP (57) ABSTRACT

An approach to facilitating identity-recognition-based promotions using virtual containers is provided. A first virtual container may be associated with a first virtual item set and identified by a first container identifier. Container instances of the first virtual container that are purchased through a store interface during a first time period may be configured to be activated by users in a game space to obtain item instances of virtual items of the first virtual item set. The first virtual container may be modified to be associated with a second virtual item set and identified by the first container identifier. Container instances of the first virtual container that are purchased during a second time period may be container instances of the modified first virtual container that are configured to be activated by the users in the game space to obtain item instances of virtual items of the second virtual item set.

18 Claims, 5 Drawing Sheets

IDENTITY-RECOGNITION-BASED PROMOTIONS USING VIRTUAL CONTAINERS

FIELD OF THE DISCLOSURE

This disclosure relates generally to identity-recognition-based promotions using virtual containers.

BACKGROUND

Traditional sales promotions such as discounting of prices may be utilized for virtual items to boost short-term profits associated with the virtual items, but may cause lingering long-term effects relating to profitability from the virtual items or perceived values of the virtual items by users. For example, direct discounting of virtual item prices may provide a temporary spike in sales, and then cause a longer period of decreased sales once the regular virtual item prices are restored. Sale of virtual containers that provide a chance to obtain a virtual item from a set of virtual items may be one technique that can be applied additionally or alternatively to traditional sales promotions to boost sales profits while avoiding or otherwise reducing the negative effects associated with traditional sales promotions. Typically, these virtual containers are offered on a one-time basis, and new virtual containers are created to replace previously offered virtual containers. However, because the new virtual containers may be unfamiliar to users, the users may be reluctant to purchase the new virtual containers, resulting in limited profits associated with sale of the new virtual containers. These and other drawbacks are contemplated.

SUMMARY

One aspect of the disclosure relates to a system configured to facilitate identity-recognition-based promotions using virtual containers, in accordance with one or more implementations. In exemplary implementations, container instances of a particular virtual container that have previously been on sale in a game space during a first time period may be placed on sale again in the game space during a second time period under the same identity, but with different benefits. By way of example, during the first time period, the virtual container may be configured to be associated with a first virtual item set and identified by a first container identifier such that container instances of the virtual container that are purchased through a store interface during the first time period may be configured to be activated by users in the game space to obtain one or more item instances of virtual items of the first virtual item set.

During the second time period, for example, the virtual container may be modified such that the modified virtual container may be associated with a second virtual item set and identified by the first container identifier such that container instances of the modified virtual container that are purchased through the store interface during the second time period may be configured to be activated by the users in the game space to obtain one or more item instances of virtual items of the second virtual item set. While the container instances of the modified virtual container may provide different benefits (e.g., to incentivize users to purchase the virtual container, to encourage users to purchase complementary virtual items, etc.), the container instances may still be "recognized" by the users as container instances of the virtual container prior to modification. The changes in the benefits may be adjusted systematically and/or according to a scheme to preserve a sense of familiarity of the users with the container. In this way, reluctance by users or other issues relating to new or different virtual containers may be reduced.

In some implementations, the system may include one or more servers. The server(s) may be configured to communicate with one or more client computing platforms according to a client/server architecture. The users may access the system and/or a virtual space (e.g., a virtual world, a game space, etc.) via the client computing platforms.

The server(s) may be configured to execute one or more computer program modules to facilitate identity-recognition-based promotions using virtual containers. The computer program modules may include one or more of a game module, an item manager module, a store module, an exchange module, and/or other modules. In some implementations, the client computing platforms may be configured to execute one or more computer program modules that are the same as or similar to the computer program modules of the server(s) to facilitate identity-recognition-based promotions using virtual containers.

The game module may be configured to execute a game instance of a game space. The game module may be configured to facilitate presentation of views of the game space to users. The game space may be configured to facilitate interaction of the users with the game space and/or each other by performing operations in the game space in response to commands received from the users.

The item manager module may be configured to generate virtual containers associated with virtual item sets and identified by container identifiers. The generated virtual containers may include a first virtual container associated with a first virtual item set and identified by a first container identifier.

The store module may be configured to present a store interface to the users. The store interface may present offers to the users to purchase container instances of the virtual containers associated with virtual item sets and identified by container identifiers. By way of example, the store interface may present an offer to the users to purchase container instances of the first virtual container. The container instances of the first virtual container that are purchased through the store interface during a first time period may, for example, be configured to be activated by the users in the game space to obtain one or more item instances of virtual items of the first virtual item set.

The exchange module may be configured to provide the container instances of the first virtual container to the users that initiated requests for a container instance of the first virtual container in exchange for consideration from the requesting users. For example, the container instances of the first virtual container may be provided to the users that purchased a container instance of the first virtual container through the store interface.

The item manager module may be configured to modify the first virtual container. The first virtual container may be modified such that the modified first virtual container is associated with a second virtual item set and is identified by the first container identifier. By way of example, the container instance of the first virtual container that are purchased through the store interface during a second promotion period may be container instances of the modified first virtual container that are configured to be activated by the users in the game space to obtain one or more item instances of virtual items of the second virtual item set. The second virtual item set may, for example, be different than the first virtual item set. In some implementations, the store module may be configured such that the second time period may be after the first time period.

In certain implementations, the virtual items of the first virtual item set may include a first virtual item and a second virtual item. The first virtual item set may include a first amount of item instances of the first virtual item and a second amount of item instances of the second virtual item. The item manager module may be configured to associate the first virtual container with the first virtual item set by preloading individual ones of the container instances of the first virtual container with one or more item instances of the virtual items of the first virtual item set such that (i) a total amount of item instances of the first virtual item that is obtainable by the users via activation of the container instances of the first virtual container that are purchased during the first time period is the first amount and (ii) a total amount of item instances of the second virtual item that is obtainable by the users via activation of the container instances of the first virtual container that are purchased during the first time period is the second amount.

In various implementations, the second virtual item set may include a third amount of item instances of the first virtual item and a fourth amount of item instances of the second virtual item. The item manager module may be configured to associate the modified first virtual container with the second virtual item set by preloading individual ones of the container instances of the modified first virtual container with one or more item instances of the virtual items of the second virtual item set. The individual ones of the container instances of the modified first virtual container may be preloaded such that (i) a total amount of item instances of the first virtual item that is obtainable by the users via activation of the container instances of the modified first virtual container is the third amount and (ii) a total amount of item instances of the second virtual item that is obtainable by the users via activation of the container instances of the modified first virtual container is the fourth amount. The third amount may, for example, be different than the first amount. The fourth amount may be different than the second amount.

In some implementations, the virtual items of the second virtual item set may include a third virtual item. Item instances of the third virtual item may not be obtainable by the users via activation of the container instances of the first virtual container that are purchased during the first time period. The second virtual item set may include a third amount of item instances of the third virtual item. The item manager module may be configured to associate the modified first virtual container with the second virtual item set by preloading individual ones of the container instances of the modified first virtual container with one or more item instances of the virtual items of the second virtual item set such that a total amount of item instances of the third virtual item that is obtainable by the users via activation of the container instances of the modified first virtual container is the third amount.

In certain implementations, the item manager module may be configured to associate the first virtual container with the first virtual item set by associating the first virtual container with (i) a first probability that a container instance of the first virtual container will provide one or more item instances of the first virtual item upon activation and (ii) a second probability that a container instance of the first virtual container will provide one or more item instances of the second virtual item upon activation. For example, the exchange module may be configured such that, responsive to activation of one of the container instances of the first virtual container that is purchased during the first time period, a user is provided with one or more item instances of the virtual items of the first virtual item set in accordance with the first probability and the second probability.

In various implementations, the virtual items of the second virtual item set may include the first virtual item and the second virtual item. The item manager module may be configured to associate the modified first virtual container with the second virtual item set by associating the modified first virtual container with (i) a third probability that a container instance of the modified first virtual container will provide one or more item instances of the first virtual item upon activation and (ii) a fourth probability that a container instance of the modified first virtual container will provide one or more item instances of the second virtual item upon activation. For example, the exchange module may be configured such that, responsive to activation of one of the container instances of the modified first virtual container, a user is provided with one or more item instances of the virtual items of the second virtual item set in accordance with the third probability and the fourth probability. The third probability may, for example, be different than the first probability. The fourth probability may be different than the second probability.

In some implementations, the virtual items of the second virtual item set may include a third virtual item. Item instances of the third virtual item may not be obtainable by the users via activation of the container instances of the first virtual container that are purchased during the first time period. The item manager module may be configured to associate the modified first virtual container with the second virtual item set by associating the modified first virtual container with a third probability that a container instance of the modified first virtual container will provide one or more item instances of the third virtual item upon activation such that, responsive to activation of one of the container instances of the modified first virtual container, a user is provided with one or more item instances of the virtual items of the second virtual item set in accordance with the third probability.

In certain implementations, the item manager module may be configured to associate the virtual containers with real-world brands or in-space brands of the game space. The real-world brands may include a first real-world brand or other real-world brands. The in-space brands may include a first in-space brand or other in-space brands. By way of example, the item manager module may be configured to associate the first virtual container and the modified first virtual container with the first real-world brand or the first in-space brand.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
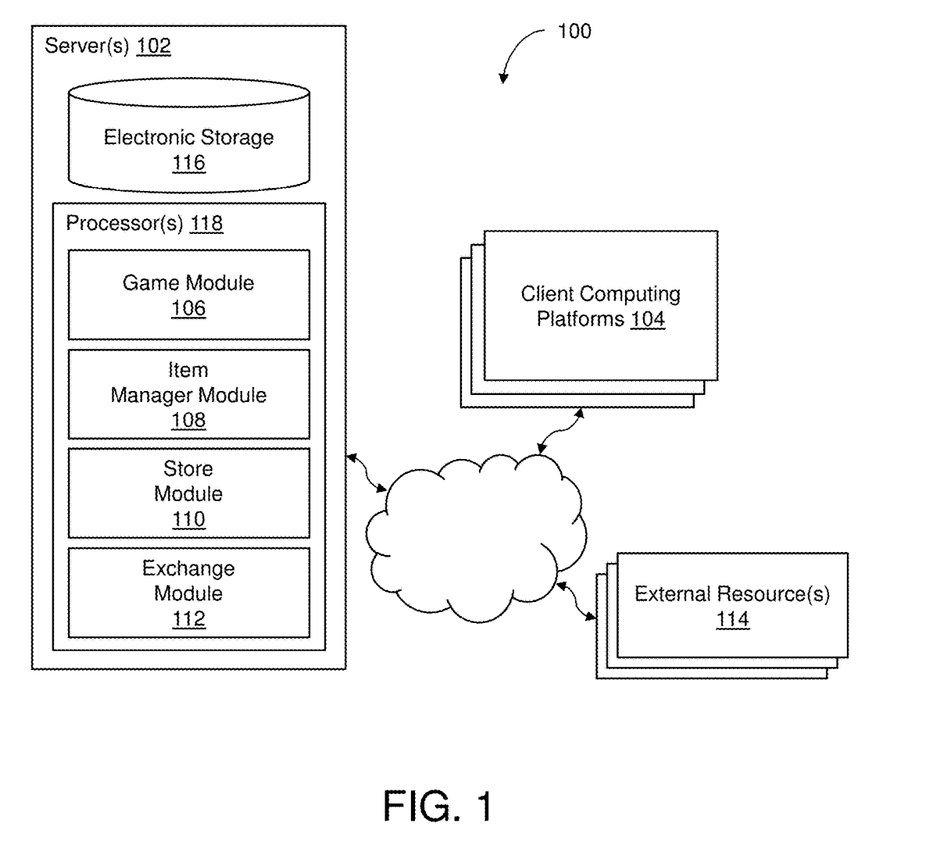
FIG. 1 illustrates a system configured to facilitate identity-recognition-based promotions using virtual containers, in accordance with one or more implementations.

FIG. 1 illustrates a system 100 configured to facilitate identity-recognition-based promotions using virtual containers, in accordance with one or more implementations. In exemplary implementations, container instances of a particular virtual container that have previously been on sale in a game space during a first time period may be placed on sale again in the game space during a second time period under the same identity, but with different benefits. By way of example, during the first time period, the virtual container may be configured to be associated with a first virtual item set and identified by a first container identifier such that container instances of the virtual container that are purchased through a store interface during the first time period may be configured to be activated by users in the game space to obtain one or more item instances of virtual items of the first virtual item set. In one scenario, container instances of the virtual container may be placed on sale again in the game space at a later point in time, for example, responsive to a determination that the users enjoyed the container instances of the virtual container that are purchased during the first time period, a determination that the container instances of the virtual container sold well during the first time period, etc., to take advantage of success associated with the particular virtual container.

For example, during the second time period, the virtual container may be modified such that the modified virtual container may be associated with a second virtual item set and identified by the first container identifier such that container instances of the modified virtual container that are purchased through the store interface during the second time period may be configured to be activated by the users in the game space to obtain one or more item instances of virtual items of the second virtual item set. While the container instances of the modified virtual container may provide different benefits (e.g., to incentivize users to purchase the virtual container, to encourage users to purchase complementary virtual items, etc.), the container instances may still be "recognized" by the users as container instances of the virtual container prior to modification. The changes in the benefits may be adjusted systematically and/or according to a scheme to preserve a sense of familiarity of the users with the virtual container. In this way, reluctance by users or other issues relating to new or different virtual containers may be reduced.

In some implementations, system 100 may include one or more servers 102. Server(s) 102 may be configured to communicate with one or more client computing platforms 104 according to a client/server architecture. The users may access system 100 and/or a virtual space (e.g., a virtual world, a game space, etc.) via client computing platforms 104.

Server(s) 102 may be configured to execute one or more computer program modules to facilitate identity-recognition-based promotions using virtual containers. The computer program modules may include one or more of a game module 106, an item manager module 108, a store module 110, an exchange module 112, and/or other modules. In some implementations, client computing platforms 104 may be configured to execute one or more computer program modules that are the same as or similar to the computer program modules of server(s) 102 to facilitate identity-recognition-based promotions using virtual containers.

Game module 106 may be configured to execute a game instance of a game space. In some implementations, the game space may be a virtual space. As such, a game instance of the game space may be an instance of the virtual space. A space module (not shown for illustrative convenience) may be configured to implement the instance of the virtual space executed by the computer modules to determine state of the virtual space. The state may then be communicated (e.g., via streaming visual data, via object/position data, and/or other state information) from server(s) 102 to client computing platforms 104 for presentation to users. The state determined and transmitted to a given client computing platform 104 may correspond to a view for a user character being controlled by a user via the given client computing platform 104. The state determined and transmitted to a given client computing platform 104 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by the space module is not intended to be limiting. The space module may be configured to express the virtual space in a more limited, or more rich, manner. For example, views determined for the virtual space representing the state of the instance of the virtual space may be selected from a limited set of graphics depicting an event in a given place within the virtual space.

The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by the space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space. In some implementations, the "inventory" of virtual goods may include virtual containers. As an example, virtual containers may include boxes, chests, bundles, packages, or other items that at least "appear" to store or contain one or more other virtual items.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102 (e.g., through the space module).

Item manager module 108 may be configured to generate virtual containers associated with virtual item sets and identified by container identifiers. The generated virtual containers may include a first virtual container associated with a first virtual item set and identified by a first container identifier.

Store module 110 may be configured to present a store interface to the users. The store interface may present offers to the users to purchase container instances of the virtual containers associated with virtual item sets and identified by container identifiers. By way of example, the store interface may present an offer to the users to purchase container instances of the first virtual container. The container instances of the first virtual container that are purchased through the store interface during a first time period may, for example, be configured to be activated by the users in the game space to obtain one or more item instances of virtual items of the first virtual item set.

Figure 2:
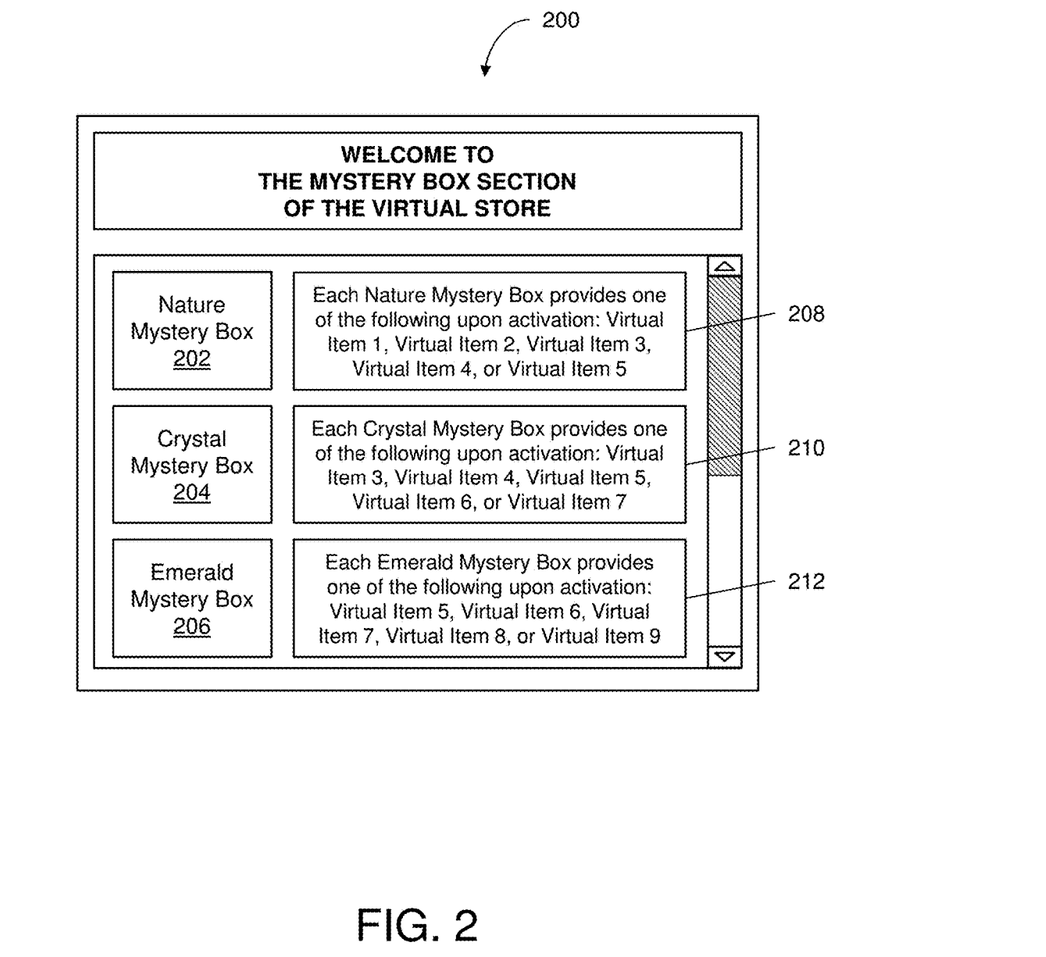
FIG. 2 illustrates a store interface that presents offers to users to purchase container instances of virtual containers along with descriptions associated with the virtual containers, in accordance with one or more implementations.

For example, FIG. 2 illustrates a store interface 200 that presents offers to users to purchase container instances of virtual containers 202, 204, and 206 along with descriptions 208, 210, and 212 associated with virtual containers 202, 204, and 206, in accordance with one or more implementations. In one use case, store interface 200 may be accessible by users of a game space. Store interface 200 may, for example, allow users to browse virtual items in a virtual store, read descriptions of the virtual items, determine prices of the virtual items, purchase the virtual items, or utilize other store features. As depicted, the virtual items of the virtual store that is accessed via store interface 200 may include virtual containers, such as Nature Mystery Box 202, Crystal Mystery Box 204, Emerald Mystery Box 206, or other virtual containers. Nature Mystery Box 202 may be identified by the container name "Nature Mystery Box." Crystal Mystery Box 204 may be identified by the container name "Crystal Mystery Box." Emerald Mystery Box 206 may be identified by the container name "Emerald Mystery Box."

Exchange module 112 may be configured to provide the container instances of the first virtual container to the users that initiated requests for a container instance of the first virtual container in exchange for consideration from the requesting users. For example, the container instances of the first virtual container may be provided to the users that purchased a container instance of the first virtual container through the store interface. With respect to FIG. 2, for example, exchange module 112 may provide a container instance of Crystal Mystery Box 204 to a user that purchased a container instance of Crystal Mystery Box 204 by adding a container instance of Crystal Mystery Box 204 to that user's "inventory" of virtual goods.

Item manager module 108 may be configured to modify the first virtual container. The first virtual container may be modified such that the modified first virtual container is associated with a second virtual item set and is identified by the first container identifier. By way of example, the container instance of the first virtual container that are purchased through the store interface during a second promotion period may be container instances of the modified first virtual container that are configured to be activated by the users in the game space to obtain one or more item instances of virtual items of the second virtual item set. The second virtual item set may, for example, be different than the first virtual item set. In some implementations, store module 110 may be configured such that the second time period may be after the first time period.

Figure 3A:
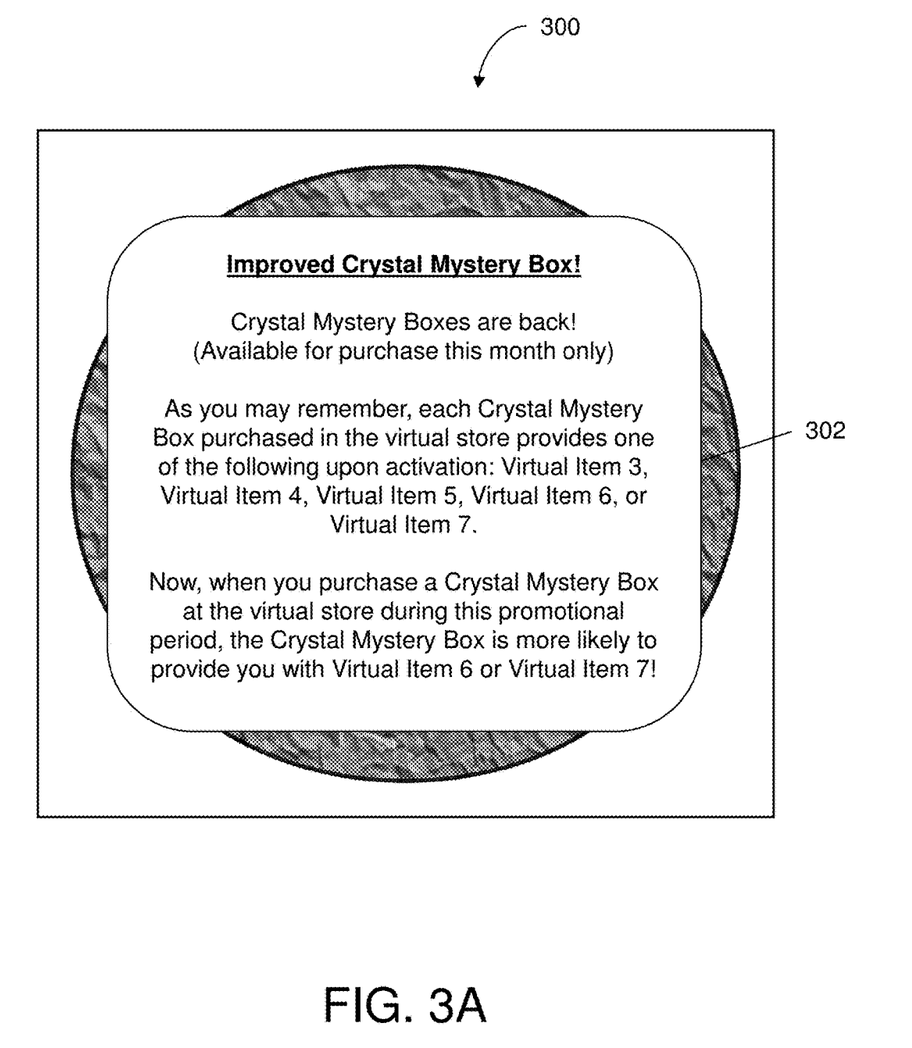
FIGS. 3A and 3B illustrate a user interface that depicts promotional notifications relating to a modified virtual container, in accordance with one or more implementations.
Figure 3B:
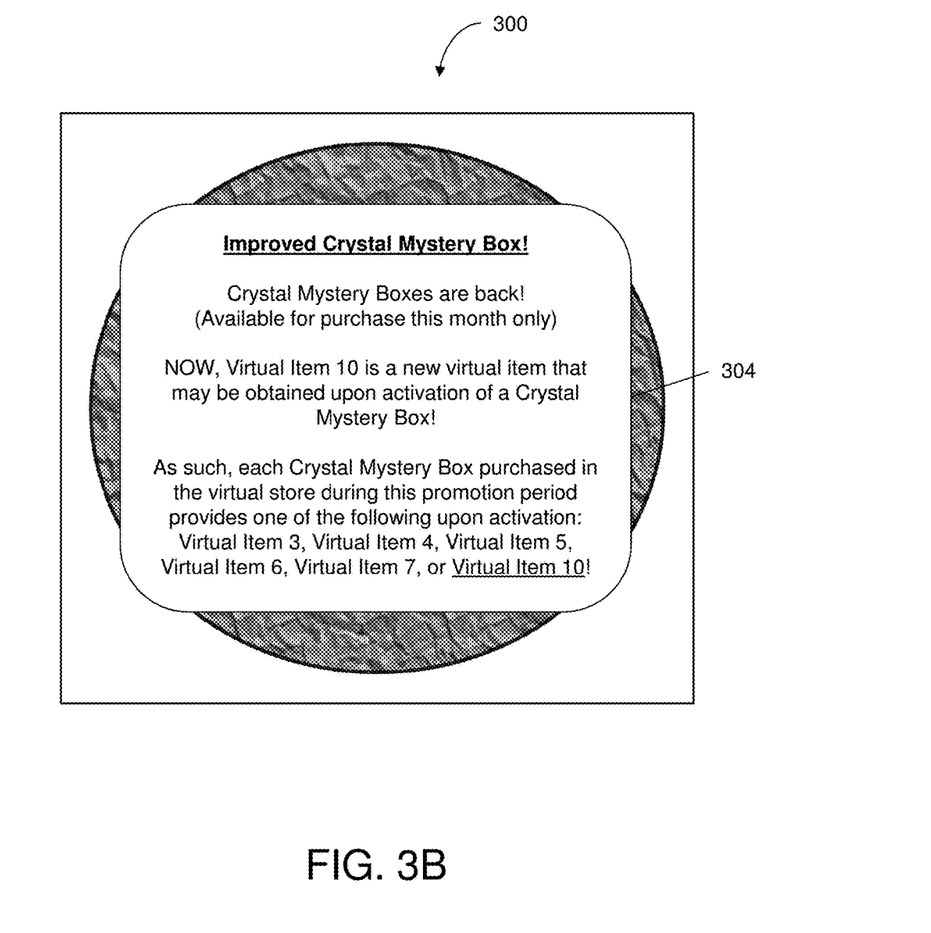

For example, FIGS. 3A and 3B illustrate a user interface 300 that depicts promotional notification 302 and 304 relating to a modified virtual container, in accordance with one or more implementations. In one use case, with respect to FIG. 3A, notification 302 indicates to users that "Crystal Mystery Boxes are back" and that the container instances of the Crystal Mystery Boxes that are currently available for purchase (e.g., during the current promotion period) are improved from the container instances of the Crystal Mystery Boxes that were previously sold. As an example, the previously sold container instances may have been a success. Such success may be related to high profits from sales of previously sold container instances, high profits from sales of complementary virtual items that are linked to sales of previously sold container instances, high user activity in the game space that is associated with the previously sold container instances, etc. The currently available container instances of the Crystal Mystery Box may, for example, be offered for sale to emulate such success by taking advantage of the perceived value that users of the game space already have of the previously sold and successful container instances, the comfort that previous purchasing users have with purchasing container instances of the Crystal Mystery Box, or other positive attributes that users may associate with the Crystal Mystery Box.

In another user case, still referring to FIG. 3A, a previously sold container instance of the Crystal Mystery Box and a currently available container instance of the Crystal Mystery Box may both provide an item instance of one of the same five virtual items upon activation (e.g., Virtual Item 3, Virtual Item 4, Virtual Item 5, Virtual Item 6, or Virtual Item 7). However, as indicated by notification 302, a container instance of the Crystal Mystery Box that is purchased during the current promotion period is more likely to provide an item instance of Virtual Items 6 or 7 upon activation than a container instance of the Crystal Mystery Box that was previously sold. Virtual Items 6 or 7 may, for example, be more valuable in the game space than the other virtual items of which item instances may be obtainable via activation of a container instance of the Crystal Mystery Box. As such, the currently available container instances of the Crystal Mystery Box may be perceived as more valuable than the previously sold container instances.

In certain implementations, the virtual items of the first virtual item set may include a first virtual item and a second virtual item. The first virtual item set may include a first amount of item instances of the first virtual item and a second amount of item instances of the second virtual item. Item manager module 108 may be configured to associate the first virtual container with the first virtual item set by preloading individual ones of the container instances of the first virtual container with one or more item instances of the virtual items of the first virtual item set. The individual ones of the container instances of the first virtual container may be preloaded such that (i) a total amount of item instances of the first virtual item that is obtainable by the users via activation of the container instances of the first virtual container that are purchased during the first time period is the first amount and (ii) a total amount of item instances of the second virtual item that is obtainable by the users via activation of the container instances of the first virtual container that are purchased during the first time period is the second amount.

Referring to FIG. 2, for example, Crystal Mystery Box 204 may be associated with the first virtual item set and identified by the first container identifier (e.g., the container name "Crystal Mystery Box"). In one use case, the first virtual item set may be predetermined to include equal amounts of item instances of each of the Virtual Items 3-7. Individual ones of container instances of Crystal Mystery Box 204 may be preloaded with an item instance of one of Virtual Items 3-7 such that the total amount of item instances of each of the Virtual Items 3-7 that can be obtained via activation of the container instances of Crystal Mystery Box 204 that are purchased during the first time period may be the predetermined equal amounts. As an example, if the first virtual item set is predetermined to include 10 item instances of each of the Virtual Items 3-7, and 50 of the container instances are purchased during the first time period, 10 item instances of each of the Virtual Items 3-7 may be obtained by the users as a whole when all of the container instances purchased during the first time period are activated.

In another use case, still referring to FIG. 2, the first virtual item set may be a dynamic virtual item set. For example, individual ones of the container instances of Crystal Mystery Box 204 may be randomly preloaded with an item instance of one of the Virtual Items 3-7 in accordance with probabilities associated with each of the Virtual Items 3-7 when the individual container instances are purchased by the users during the first time period. If, for example, the probability of each of the Virtual Items 3-7 of being selected for preloading of a container instance is 20%, and 50 of the container instances are purchased during the first time period, it is likely that about 10 item instances of each of the Virtual Items 3-7 may be obtained by the users as a whole when all of the container instances purchased during the first time period are activated.

As indicated, in various implementations, the first virtual item set may include the first amount of item instances of the first virtual item and the second amount of item instances of the second virtual item. The second virtual item set may include a third amount of item instances of the first virtual item and a fourth amount of item instances of the second virtual item. Item manager module 108 may be configured to associate the modified first virtual container with the second virtual item set by preloading individual ones of the container instances of the modified first virtual container with one or more item instances of the virtual items of the second virtual item set. The individual ones of the container instances of the modified first virtual container may be preloaded such that (i) a total amount of item instances of the first virtual item that is obtainable by the users via activation of the container instances of the modified first virtual container is the third amount and (ii) a total amount of item instances of the second virtual item that is obtainable by the users via activation of the container instances of the modified first virtual container is the fourth amount. The third amount may, for example, be different than the first amount. The fourth amount may be different than the second amount.

In one scenario, with respect to FIG. 2, the first virtual item set may include item instances that are randomly selected for preloading of individual ones of the first-time-period container instances of the Crystal Mystery Box (e.g., Crystal Mystery Box 204) in accordance with first-time-period probabilities associated with each of the Virtual Items 3-7 when the individual container instances are purchased by the users during the first time period. In another scenario, with respect to FIG. 3A, the second virtual item set may include item instances that are randomly selected for preloading of individual ones of the second-time-period container instances of the Crystal Mystery Box (e.g., the "improved" Crystal Mystery Box) in accordance with second-time-period probabilities associated with each of the Virtual Items 3-7 when the individual container instances are purchased by the users during the second time period.

As indicated by notification 302, the second-time-period probabilities of each of Virtual Items 6 and 7 are respectively greater than the first-time-period probabilities of each of Virtual Items 6 and 7. As such, if 50 of the container instances of the Crystal Mystery Box are purchased during the first time period, and 50 of the container instances of the Crystal Mystery Box are purchased during the second time period, it is likely that more item instances of Virtual Items 6 or 7 will be obtained by the users as a whole via activation of all of the container instances purchased during the second time period than via activation of all of the container instances purchased during the first time period.

As indicated, in some implementations, the virtual items of the first virtual item set may include the first virtual item and the second virtual item. The virtual items of the second virtual item set may include a third virtual item. Item instances of the third virtual item may not be obtainable by the users via activation of the container instances of the first virtual container that are purchased during the first time period. The second virtual item set may include a third amount of item instances of the third virtual item. Item manager module 108 may be configured to associate the modified first virtual container with the second virtual item set by preloading individual ones of the container instances of the modified first virtual container with one or more item instances of the virtual items of the second virtual item set. The individual ones of the container instances of the modified first virtual container may be preloaded such that a total amount of item instances of the third virtual item that is obtainable by the users via activation of the container instances of the modified first virtual container is the third amount.

In one scenario, with respect to FIG. 2, the first virtual item set may include item instances that are randomly selected for preloading of individual ones of the first-time-period container instances of the Crystal Mystery Box (e.g., Crystal Mystery Box 204) in accordance with first-time-period probabilities associated with each of the Virtual Items 3-7 when the individual container instances are purchased by the users during the first time period. In another scenario, with respect to FIG. 3B, the second virtual item set may include item instances that are randomly selected for preloading of individual ones of the second-time-period container instances of the Crystal Mystery Box (e.g., the "improved" Crystal Mystery Box) in accordance with second-time-period probabilities associated with each of the Virtual Items 3-7 and 10 when the individual container instances are purchased by the users during the second time period. As indicated by notification 304, an item instance of Virtual Item 10 is one of the item instances that may be obtained via activation of the container instances purchased during the second time period, while item instances of Virtual Item 10 are not one of the item instances that may be obtained via activation of the container instances purchased during the first time period.

As indicated, in certain implementations, the virtual items of the first virtual item set may include the first virtual item and the second virtual item. In one or more implementations, item manager module 108 may be configured to associate the first virtual container with the first virtual item set by associating the first virtual container with (i) a first probability that a container instance of the first virtual container will provide one or more item instances of the first virtual item upon activation and (ii) a second probability that a container instance of the first virtual container will provide one or more item instances of the second virtual item upon activation. For example, exchange module 112 may be configured such that, responsive to activation of one of the container instances of the first virtual container that is purchased during the first time period, a user is provided with one or more item instances of the virtual items of the first virtual item set in accordance with the first probability and the second probability.

As discussed, in one use case with respect to FIG. 2, Crystal Mystery Box 204 may be associated with the first virtual item set and identified by the first container identifier (e.g., the container name "Crystal Mystery Box"). For example, association of Crystal Mystery Box 204 with the first virtual item set may include associating Crystal Mystery Box 204 with probabilities for each of Virtual Items 3-7 that a container instance of Crystal Mystery Box 204 will provide an item instance of the virtual item upon activation. If, for example, the probabilities for each of Virtual Items 3-7 that a container instance will provide an item instances of the virtual item is 20% upon activation, then each activation of a container instance of Crystal Mystery Box 204 that is purchased during the first time period may provide a user an equal probability of obtaining an item instance of any one of Virtual Items 3-7.

In various implementations, the virtual items of the second virtual item set may include the first virtual item and the second virtual item. Item manager module 108 may be configured to associate the modified first virtual container with the second virtual item set by associating the modified first virtual container with (i) a third probability that a container instance of the modified first virtual container will provide one or more item instances of the first virtual item upon activation and (ii) a fourth probability that a container instance of the modified first virtual container will provide one or more item instances of the second virtual item upon activation. For example, exchange module 112 may be configured such that, responsive to activation of one of the container instances of the modified first virtual container, a user is provided with one or more item instances of the virtual items of the second virtual item set in accordance with the third probability and the fourth probability. The third probability may, for example, be different than the first probability. The fourth probability may be different than the second probability.

In one scenario, with respect to FIG. 2, association of the Crystal Mystery Box (e.g., Crystal Mystery Box 204) with the first virtual item set may include associating the Crystal Mystery Box with first-time-period probabilities for each of Virtual Items 3-7 that a container instance of Crystal Mystery Box 204 will provide an item instance of the virtual item upon activation. In another scenario, with respect to FIG. 3A, association of the Crystal Mystery Box (e.g., the "improved" Crystal Mystery Box) with the second virtual item set may include associating the Crystal Mystery Box with second-time-period probabilities for each of Virtual Items 3-7 that a container instance of the Crystal Mystery Box will provide an item instance of the virtual item upon activation.

As indicated by notification 302, the second-time-period probabilities of each of Virtual Items 6 and 7 being provided to a user upon activation of a container instance of the Crystal Mystery Box are respectively greater than the first-time-period probabilities of each of Virtual Items 6 and 7 being provided to a user upon activation of a container instance of the Crystal Mystery Box. As such, it is more likely that a user will obtain an item instance of Virtual Items 6 or 7 via activation of a container instance of the Crystal Mystery Box that is purchased during the second time period than via activation of a container instance of the Crystal Mystery Box that is purchased during the first time period.

In some implementations, the virtual items of the second virtual item set may include a third virtual item. Item instances of the third virtual item may not be obtainable by the users via activation of the container instances of the first virtual container that are purchased during the first time period. Item manager module 108 may be configured to associate the modified first virtual container with the second virtual item set by associating the modified first virtual container with a third probability that a container instance of the modified first virtual container will provide one or more item instances of the third virtual item upon activation such that, responsive to activation of one of the container instances of the modified first virtual container, a user is provided with one or more item instances of the virtual items of the second virtual item set in accordance with the third probability.

In one scenario, with respect to FIG. 2, association of the Crystal Mystery Box (e.g., Crystal Mystery Box 204) with the first virtual item set may include associating the Crystal Mystery Box with first-time-period probabilities for each of Virtual Items 3-7 that a container instance of Crystal Mystery Box 204 will provide an item instance of the virtual item upon activation. In another scenario, with respect to FIG. 3A, association of the Crystal Mystery Box (e.g., the "improved" Crystal Mystery Box) with the second virtual item set may include associating the Crystal Mystery Box with second-time-period probabilities for each of Virtual Items 3-7 and 10 that a container instance of the Crystal Mystery Box will provide an item instance of the virtual item upon activation. As indicated by notification 304, an item instance of Virtual Item 10 is one of the item instances that may be obtained via activation of the container instances purchased during the second time period, while item instances of Virtual Item 10 are not one of the item instances that may be obtained via activation of the container instances purchased during the first time period.

In certain implementations, item manager module 108 may be configured to associate the virtual containers with real-world brands or in-space brands of the game space. The real-world brands may include a first real-world brand or other real-world brands. The in-space brands may include a first in-space brand or other in-space brands. By way of example, item manager module 108 may be configured to associate the first virtual container and the modified first virtual container with the first real-world brand or the first in-space brand.

In one use case, with respect to FIG. 3A, container instances of the Crystal Mystery Box that were previously sold during the first time period and container instances of the Crystal Mystery Box that are currently available for purchase during the second time period may reflect an association with an in-space brand. By way of example, a plurality of in-space brands may recognized in a game space in which the container instances of the Crystal Mystery Box are activated. The in-space brands that are officially recognized in the game space may include "Brand X," "Brand Y," and "Brand Z." Each of the container instances of the Crystal Mystery Box may, for example, reflect an association with "Brand X," regardless of whether the container instance is purchased during the first time period or the second time period. In this way, if "Brand X" is a reputable brand in the game space that is known to provide virtual containers with better odds of obtaining high-value virtual items or other sought-after in-space benefits, users may believe that container instances of the Crystal Mystery Box have those better odds or other sought-after in-space benefits.

Server(s) 102, client computing platforms 104, external resources 114, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 114, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 114, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 114 may include sources of information, hosts and/or providers of virtual spaces outside of system 100, external entities participating with system 100, and/or other resources. In some implementations, some or all of the functionality attributed herein to external resources 114 may be provided by resources included in system 100.

In some implementations, server(s) 102 may include an electronic storage 116, one or more processor(s) 118, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 116 may comprise non-transitory storage media that electronically stores information. The electronic storage media of electronic storage 116 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 116 may store software algorithms, information determined by processor(s) 118, information received from server(s) 102, information received from client computing platforms 104, and/or other information that enables server(s) 102 to function as described herein.

Processor(s) 118 is configured to provide information processing capabilities in server(s) 102. As such, processor(s) 118 may include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 may include a plurality of processing units. These processing units may be physically located within the same device, or processor(s) 118 may represent processing functionality of a plurality of devices operating in coordination. Processor(s) 118 may be configured to execute modules 106, 108, 110, 112, and/or other modules. Processor(s) 118 may be configured to execute modules 106, 108, 110, 112, and/or other modules by software; hardware; firmware; some combination of software, hardware, and/or firmware; and/or other mechanisms for configuring processing capabilities on processor(s) 118. As noted, in certain implementations, a given client computing platform 104 may include one or more computer program modules that is the same as or similar to the computer program modules of server(s) 102. Client computing platform 104 may include one or more processors that are the same or similar to processor(s) 118 of server(s) 102 to execute such computer program modules of client computing platform 104.

It should be appreciated that although modules 106, 108, 110, and 112 are illustrated in FIG. 1 as being co-located within a single processing unit, in implementations in which processor(s) 118 includes multiple processing units, one or more of modules 106, 108, 110, and/or 112 may be located remotely from the other modules. The description of the functionality provided by the different modules 106, 108, 110, and/or 112 described below is for illustrative purposes, and is not intended to be limiting, as any of modules 106, 108, 110, and/or 112 may provide more or less functionality than is described. For example, one or more of modules 106, 108, 110, and/or 112 may be eliminated, and some or all of its functionality may be provided by other ones of modules 106, 108, 110, and/or 112. As another example, processor(s) 118 may be configured to execute one or more additional modules that may perform some or all of the functionality attributed below to one of modules 106, 108, 110, and/or 112.

Figure 4:
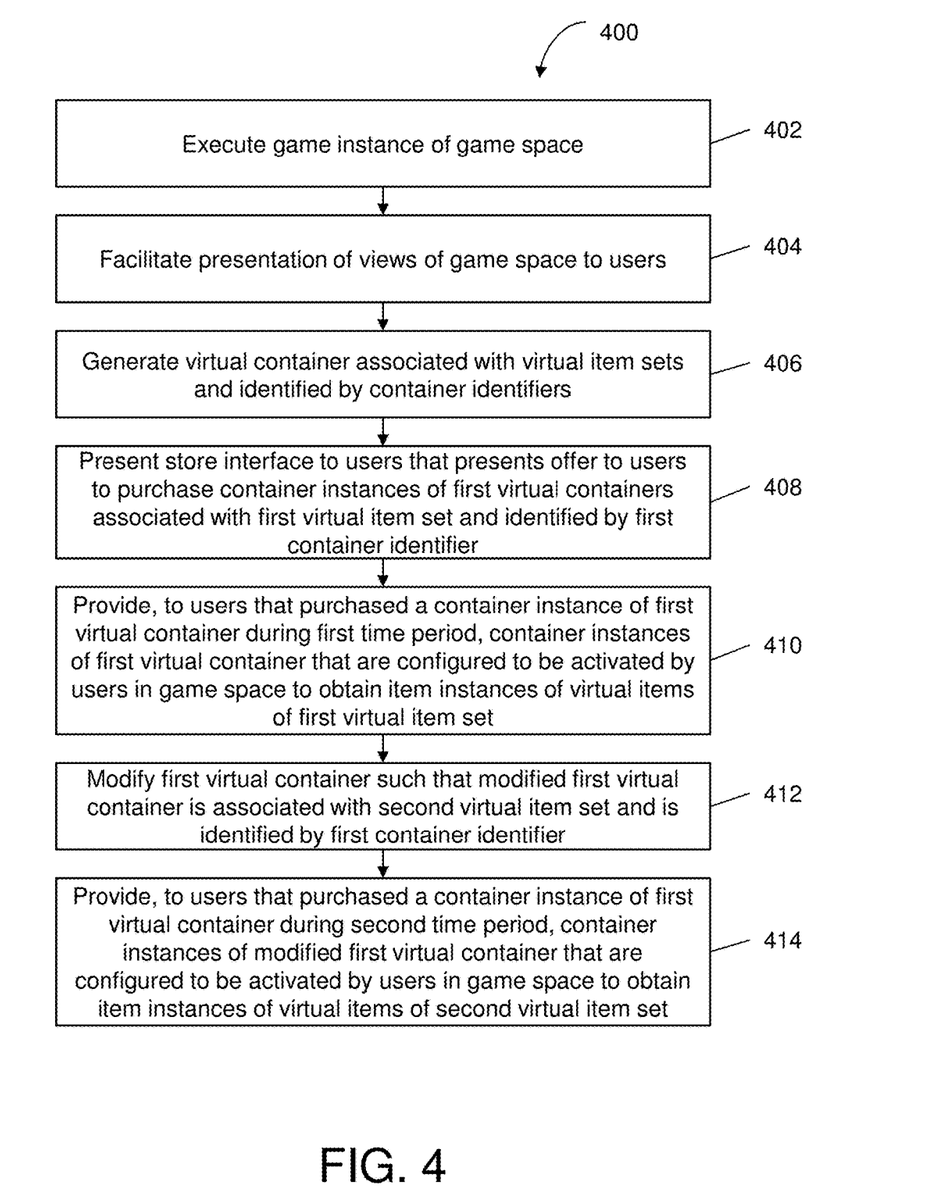
FIG. 4 illustrates a method for facilitating identity-recognition-based promotions using virtual containers, in accordance with one or more implementations.

FIG. 4 illustrates a method for facilitating identity-recognition-based promotions using virtual containers, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a game instance of a game space may be executed. Operation 402 may be performed by a game module that is the same as or similar to game module 106, in accordance with one or more implementations.

At an operation 404, presentation of views of the game space to users may be facilitated. The game space may be configured to facilitate interaction of the users with the game space and/or each other by performing operations in the game space in response to commands received from the users. Operation 404 may be performed by a game module that is the same as or similar to game module 106, in accordance with one or more implementations.

At an operation 406, virtual containers associated with virtual item sets and identified by container identifiers may be generated. The generated virtual containers may include a first virtual container associated with a first virtual item set and identified by a first container identifier. Operation 406 may be performed by an item manager module that is the same as or similar to item manager module 108, in accordance with one or more implementations.

At an operation 408, a store interface may be presented. The store interface may present offers to the users to purchase container instances of virtual containers associated with virtual item sets and identified by container identifiers. The virtual containers may include a first virtual container associated with a first virtual item set and identified by a first container identifier. For example, the store interface may present an offer to the users to purchase container instances of the first virtual container such that container instances of the first virtual container that are purchased through the store interface during a first time period may be configured to be activated by the users in the game space to obtain one or more item instances of virtual items of the first virtual item set. Operation 408 may be performed by a store module that is the same as or similar to store module 110, in accordance with one or more implementations.

At an operation 410, the container instances of the first virtual container that are configured to be activated by the users in the game space to obtain one or more item instances of virtual items of the first virtual item set may be provided to the users that purchased a container instance of the first virtual container during the first time period. Operation 410 may be performed by an exchange module that is the same as or similar to exchange module 112, in accordance with one or more implementations.

At an operation 412, the first virtual container may be modified such that the modified first virtual container is associated with a second virtual item set and is identified by the first container identifier. For example, container instances of the modified first virtual container may be configured to be activated by the users in the game space to obtain one or more item instances of virtual items of the second virtual item set. Operation 412 may be performed by an item manager module that is the same as or similar to item manager module 108, in accordance with one or more implementations.

At an operation 414, container instances of the modified first virtual container that are configured to be activated by the users in the game space to obtain one or more item instances of virtual items of the second virtual item set may be provided to the users that purchased a container instance of the first virtual container during the second time period. For example, the container instances of the first virtual container that are purchased during the second time period may be the container instances of the modified first virtual container. Operation 414 may be performed by an exchange module that is the same as or similar to exchange module 112, in accordance with one or more implementations.

In certain implementations, with respect to operations 406, 408, and 410, the virtual items of the first virtual item set may include a first virtual item and a second virtual item. The first virtual item set may include a first amount of item instances of the first virtual item and a second amount of item instances of the second virtual item. In one or more implementations, the first virtual container may be associated with the first virtual item set by preloading individual ones of the container instances of the first virtual container with one or more item instances of the virtual items of the first virtual item set. The individual ones of the container instances of the first virtual container may be preloaded such that (i) a total amount of item instances of the first virtual item that is obtainable by the users via activation of the container instances of the first virtual container that are purchased during the first time period is the first amount and (ii) a total amount of item instances of the second virtual item that is obtainable by the users via activation of the container instances of the first virtual container that are purchased during the first time period is the second amount. The association of the first virtual container with the first virtual item set may be performed by an item manager module that is the same as or similar to item manager module 108, in accordance with one or more implementations.

In various implementations, with respect to operations 412 and 414, the second virtual item set may include a third amount of item instances of the first virtual item and a fourth amount of item instances of the second virtual item. In one or more implementations, the modified first virtual container may be associated with the second virtual item set by preloading individual ones of the container instances of the modified first virtual container with one or more item instances of the virtual items of the second virtual item set. The individual ones of the container instances of the modified first virtual container may be preloaded such that (i) a total amount of item instances of the first virtual item that is obtainable by the users via activation of the container instances of the modified first virtual container is the third amount and (ii) a total amount of item instances of the second virtual item that is obtainable by the users via activation of the container instances of the modified first virtual container is the fourth amount. The third amount may, for example, be different than the first amount. The fourth amount may be different than the second amount. The association of the modified first virtual container with the second virtual item set may be performed by an item manager module that is the same as or similar to item manager module 108, in accordance with one or more implementations.

In some implementations, with respect to operations 412 and 414, the virtual items of the second virtual item set may include a third virtual item. Item instances of the third virtual item may not be obtainable by the users via activation of the container instances of the first virtual container that are purchased during the first time period. The second virtual item set may include a third amount of item instances of the third virtual item. In one or more implementations, the modified first virtual container may be associated with the second virtual item set by preloading individual ones of the container instances of the modified first virtual container with one or more item instances of the virtual items of the second virtual item set. The individual ones of the container instances of the modified first virtual container may be preloaded such that a total amount of item instances of the third virtual item that is obtainable by the users via activation of the container instances of the modified first virtual container is the third amount. The association of the modified first virtual container with the second virtual item set may be performed by an item manager module that is the same as or similar to item manager module 108, in accordance with one or more implementations.

In certain implementations, with respect to operations 406, 408, and 410, the virtual items of the first virtual item set may include a first virtual item and a second virtual item. In one or more implementations, the first virtual container may be associated with the first virtual item set by associating the first virtual container with (i) a first probability that a container instance of the first virtual container will provide one or more item instances of the first virtual item upon activation and (ii) a second probability that a container instance of the first virtual container will provide one or more item instances of the second virtual item upon activation. The first virtual container may be associated with the first probability and the second probability such that, responsive to activation of one of the container instances of the first virtual container that is purchased during the first time period, a user is provided with one or more item instances of the virtual items of the first virtual item set in accordance with the first probability and the second probability. The association of the first virtual container with the first virtual item set may be performed by an item manager module that is the same as or similar to item manager module 108, in accordance with one or more implementations.

In various implementations, with respect to operations 412 and 414, the virtual items of the second virtual item set may include the first virtual item and the second virtual item. In one or more implementations, the modified first virtual container may be associated with the second virtual item set by associating the modified first virtual container with (i) a third probability that a container instance of the modified first virtual container will provide one or more item instances of the first virtual item upon activation and (ii) a fourth probability that a container instance of the modified first virtual container will provide one or more item instances of the second virtual item upon activation. The modified first virtual container may be associated with the third probability and the fourth probability such that, responsive to activation of one of the container instances of the modified first virtual container, a user is provided with one or more item instances of the virtual items of the second virtual item set in accordance with the third probability and the fourth probability. The third probability may, for example, be different than the first probability. The fourth probability may be different than the second probability. The association of the modified first virtual container with the second virtual item set may be performed by an item manager module that is the same as or similar to item manager module 108, in accordance with one or more implementations.

In some implementations, with respect to operations 412 and 414, the virtual items of the second virtual item set may include a third virtual item. Item instances of the third virtual item may not be obtainable by the users via activation of the container instances of the first virtual container that are purchased during the first time period. In one or more implementations, the modified first virtual container may be associated with the second virtual item set by associating the modified first virtual container with a third probability that a container instance of the modified first virtual container will provide one or more item instances of the third virtual item upon activation. The modified first virtual container may be associated with the third probability such that, responsive to activation of one of the container instances of the modified first virtual container, a user is provided with one or more item instances of the virtual items of the second virtual item set in accordance with the third probability. The association of the modified first virtual container with the second virtual item set may be performed by an item manager module that is the same as or similar to item manager module 108, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for modifying virtual containers within a game space, the system comprising:
one or more processors configured by machine-readable instructions to:
execute a game instance of the game space, and to facilitate presentation of views of the game space to users, wherein the game space is configured to facilitate interaction of the users with the game space and/or each other by performing operations in the game space in response to commands received from the users;
receive requests for container instances of virtual containers, wherein the requests are received from the users in exchange for consideration from the requesting users, wherein the container instances of the virtual containers are associated with virtual item sets and are identified by container identifiers, and wherein the requesting users include a first user that provided a first request for a first container instance;
responsive to receiving the requests, effectuate provision of the container instances of the virtual containers in the game space, such that responsive to the provision of the container instances to the users in the game space, the container instances are added to inventories of virtual items associated with the users, the virtual containers including a first virtual container provided to one or more of the users including the first user and added to the inventories of virtual items associated with the one or more of the users, including a first inventory associated with the first user, the first virtual container being identified by a first container identifier and associated with a first virtual item set for a first time period, such that container instances of the first virtual container that are obtained during the first time period and added to the first inventory associated with the first user will provide item instances of virtual items in the first virtual item set upon activation of the container instances by the first user;
modify the first virtual container identified by the first container identifier such that the modified first virtual container is associated with a second virtual item set and is identified by the first container identifier, wherein the second virtual item set is different than the first virtual item set, and wherein container instances of the first virtual container that are obtained during a second time period and added to the first inventory will provide item instances of virtual items in the second virtual item set upon activation of the container instances by the first user;
receive, from the first user and subsequent to the first request, a second request for a second container instance of the first virtual container, wherein the second request is received during the second time period;
receive, from the first user, a first activation command to activate the first container instance of the first virtual container and effectuate, responsive to the first activation command, activation of the first container instance such that item instances of the virtual items in the first virtual item set are provided to the first user, wherein the first activation command is separate and distinct from the first request; and
receive, from the first user, a second activation command to activate the second container instance of the first virtual container and effectuate, responsive to the second activation command, activation of the second container instance such that item instances of the virtual items in the second virtual item set are provided to the first user, wherein the second activation command is separate and distinct from the second request.

2. The system of claim 1, wherein the one or more processors are further configured by machine-readable instructions such that the second time period is after the first time period.

3. The system of claim 1, wherein the virtual items of the first virtual item set include a first virtual item and a second virtual item, and the first virtual item set includes a first amount of item instances of the first virtual item and a second amount of item instances of the second virtual item, and wherein the one or more processors are further configured by machine-readable instructions to associate the first virtual container with the first virtual item set by preloading individual ones of the container instances of the first virtual container with one or more item instances of the virtual items of the first virtual item set such that (i) a total amount of item instances of the first virtual item that is obtainable by the users via activation of the container instances of the first virtual container that are obtained during the first time period is the first amount and (ii) a total amount of item instances of the second virtual item that is obtainable by the users via activation of the container instances of the first virtual container that are obtained during the first time period is the second amount.

4. The system of claim 3, wherein the virtual items of the second virtual item set includes the first virtual item and the second virtual item, and the second virtual item set includes a third amount of item instances of the first virtual item and a fourth amount of item instances of the second virtual item, wherein the third amount is different than the first amount or the fourth amount is different than the second amount, and wherein the one or more processors are further configured by machine-readable instructions to associate the modified first virtual container with the second virtual item set by preloading individual ones of the container instances of the modified first virtual container with one or more item instances of the virtual items of the second virtual item set such that (i) a total amount of item instances of the first virtual item that is obtainable by the users via activation of the container instances of the modified first virtual container is the third amount and (ii) a total amount of item instances of the second virtual item that is obtainable by the users via activation of the container instances of the modified first virtual container is the fourth amount.

5. The system of claim 3, wherein the virtual items of the second virtual item set includes a third virtual item, wherein item instances of the third virtual item are not obtainable by the users via activation of the container instances of the first virtual container that are obtained during the first time period, wherein the second virtual item set includes a third amount of item instances of the third virtual item, and wherein the one or more processors are further configured by machine-readable instructions to associate the modified first virtual container with the second virtual item set by preloading individual ones of the container instances of the modified first virtual container with one or more item instances of the virtual items of the second virtual item set such that a total amount of item instances of the third virtual item that is obtainable by the users via activation of the container instances of the modified first virtual container is the third amount.

6. The system of claim 1, wherein the virtual items of the first virtual item set include a first virtual item and a second virtual item, and wherein the one or more processors are further configured by machine-readable instructions to associate the first virtual container with the first virtual item set by associating the first virtual container with (i) a first probability that a container instance of the first virtual container will provide one or more item instances of the first virtual item upon activation and (ii) a second probability that a container instance of the first virtual container will provide one or more item instances of the second virtual item upon activation such that, responsive to activation of one of the container instances of the first virtual container that is obtained during the first time period, a user is provided with one or more item instances of the virtual items of the first virtual item set in accordance with the first probability and the second probability.

7. The system of claim 6, wherein the virtual items of the second virtual item set includes the first virtual item and the second virtual item, wherein the one or more processors are further configured by machine-readable instructions to associate the modified first virtual container with the second virtual item set by associating the modified first virtual container with (i) a third probability that a container instance of the modified first virtual container will provide one or more item instances of the first virtual item upon activation and (ii) a fourth probability that a container instance of the modified first virtual container will provide one or more item instances of the second virtual item upon activation such that, responsive to activation of one of the container instances of the modified first virtual container, a user is provided with one or more item instances of the virtual items of the second virtual item set in accordance with the third probability and the fourth probability, and wherein the third probability is different than the first probability or the fourth probability is different than the second probability.

8. The system of claim 6, wherein the virtual items of the second virtual item set includes a third virtual item, wherein item instances of the third virtual item are not obtainable by the users via activation of the container instances of the first virtual container that are obtained during the first time period, and wherein the one or more processors are further configured by machine-readable instructions to associate the modified first virtual container with the second virtual item set by associating the modified first virtual container with a third probability that a container instance of the modified first virtual container will provide one or more item instances of the third virtual item upon activation such that, responsive to activation of one of the container instances of the modified first virtual container, a user is provided with one or more item instances of the virtual items of the second virtual item set in accordance with the third probability.

9. The system of claim 1, wherein the one or more processors are further configured by machine-readable instructions to associate the virtual containers with real-world brands or in-space brands of the game space such that the first virtual container and the modified first virtual container are associated with a first real-world brand or a first in-space brand, and wherein the real-world brands include the first real-world brand, and the in-space brands include the first in-space brand.

10. A computer-implemented method of modifying virtual containers within a game space, the method being implemented on a computer system that includes one or more physical processors, the method comprising:

executing a game instance of the game space, and to facilitate presentation of views of the game space to users, wherein the game space is configured to facilitate interaction of the users with the game space and/or each other by performing operations in the game space in response to commands received from the users;

receiving requests for container instances of virtual containers, wherein the requests are received from the users in exchange for consideration from the requesting users, wherein the container instances of the virtual containers are associated with virtual item sets and are identified by container identifiers, and wherein the requesting users include a first user that provided a first request for a first container instance;

responsive to receiving the requests, effectuating provision of the container instances of the virtual containers in the game space, such that responsive to the provision of the container instances to the users in the game space, the container instances are added to inventories of virtual items associated with the users, the virtual containers including a first virtual container provided to one or more of the users including the first user and added to the inventories of virtual items associated with the one or more of the users, including a first inventory associated with the first user, the first virtual container being identified by a first container identifier and associated with a first virtual item set for a first time period, such that container instances of the first virtual container that are obtained during the first time period and added to the first inventory associated with the first user will provide item instances of virtual items in the first virtual item set upon activation of the container instances by the first user;

modifying the first virtual container identified by the first container identifier such that the modified first virtual container is associated with a second virtual item set and is identified by the first container identifier, wherein the second virtual item set is different than the first virtual item set, and wherein container instances of the first virtual container that are obtained during a second time period and added to the first inventory will provide item instances of virtual items in the second virtual item set upon activation of the container instances by the first user;

receive, from the first user and subsequent to the first request, a second request for a second container instance of the first virtual container, wherein the second request is received during the second time period;

receive, from the first user, a first activation command to activate the first container instance of the first virtual container and effectuate, responsive to the first activation command, activation of the first container instance such that item instances of the virtual items in the first virtual item set are provided to the first user, wherein the first activation command is separate and distinct from the first request; and receive, from the first user, a second activation command to activate the second container instance of the first virtual container and effectuate, responsive to the second activation command, activation of the second container instance such that item instances of the virtual items in the second virtual item set are provided to the first user, wherein the second activation command is separate and distinct from the second request.

11. The method of claim 10, wherein the second time period is after the first time period.

12. The method of claim 10, wherein the virtual items of the first virtual item set include a first virtual item and a second virtual item, and the first virtual item set includes a first amount of item instances of the first virtual item and a second amount of item instances of the second virtual item, the method further comprising associating the first virtual container with the first virtual item set by preloading individual ones of the container instances of the first virtual container with one or more item instances of the virtual items of the first virtual item set such that (i) a total amount of item instances of the first virtual item that is obtainable by the users via activation of the container instances of the first virtual container that are obtained during the first time period is the first amount and (ii) a total amount of item instances of the second virtual item that is obtainable by the users via activation of the container instances of the first virtual container that are obtained during the first time period is the second amount.

13. The method of claim 12, wherein the virtual items of the second virtual item set includes the first virtual item and the second virtual item, and the second virtual item set includes a third amount of item instances of the first virtual item and a fourth amount of item instances of the second virtual item, and wherein the third amount is different than the first amount or the fourth amount is different than the second amount, the method further comprising associating the modified first virtual container with the second virtual item set by preloading individual ones of the container instances of the modified first virtual container with one or more item instances of the virtual items of the second virtual item set such that (i) a total amount of item instances of the first virtual item that is obtainable by the users via activation of the container instances of the modified first virtual container is the third amount and (ii) a total amount of item instances of the second virtual item that is obtainable by the users via activation of the container instances of the modified first virtual container is the fourth amount.

14. The method of claim 12, wherein the virtual items of the second virtual item set includes a third virtual item, wherein item instances of the third virtual item are not obtainable by the users via activation of the container instances of the first virtual container that are obtained during the first time period, and wherein the second virtual item set includes a third amount of item instances of the third virtual item, the method further comprising associating the modified first virtual container with the second virtual item set by preloading individual ones of the container instances of the modified first virtual container with one or more item instances of the virtual items of the second virtual item set such that a total amount of item instances of the third virtual item that is obtainable by the users via activation of the container instances of the modified first virtual container is the third amount.

15. The method of claim 10, wherein the virtual items of the first virtual item set include a first virtual item and a second virtual item, the method further comprising associating the first virtual container with the first virtual item set by associating the first virtual container with (i) a first probability that a container instance of the first virtual container will provide one or more item instances of the first virtual item upon activation and (ii) a second probability that a container instance of the first virtual container will provide one or more item instances of the second virtual item upon activation such that, responsive to activation of one of the container instances of the first virtual container that is obtained during the first time period, a user is provided with one or more item instances of the virtual items of the first virtual item set in accordance with the first probability and the second probability.

16. The method of claim 15, wherein the virtual items of the second virtual item set includes the first virtual item and the second virtual item, the method further comprising associating the modified first virtual container with the second virtual item set by associating the modified first virtual container with (i) a third probability that a container instance of the modified first virtual container will provide one or more item instances of the first virtual item upon activation and (ii) a fourth probability that a container instance of the modified first virtual container will provide one or more item instances of the second virtual item upon activation such that, responsive to activation of one of the container instances of the modified first virtual container, a user is provided with one or more item instances of the virtual items of the second virtual item set in accordance with the third probability and the fourth probability, wherein the third probability is different than the first probability or the fourth probability is different than the second probability.

17. The method of claim 15, wherein the virtual items of the second virtual item set includes a third virtual item, and wherein item instances of the third virtual item are not obtainable by the users via activation of the container instances of the first virtual container, the method further comprising associating the modified first virtual container with the second virtual item set by associating the modified first virtual container with a third probability that a container instance of the modified first virtual container will provide one or more item instances of the third virtual item upon activation such that, responsive to activation of one of the container instances of the modified first virtual container, a user is provided with one or more item instances of the virtual items of the second virtual item set in accordance with the third probability.

18. The method of claim 10, further comprising associating the virtual containers with real-world brands or in-space brands of the game space such that the first virtual container and the modified first virtual container are associated with a first real-world brand or a first in-space brand, wherein the real-world brands include the first real-world brand, and the in-space brands include the first in-space brand.

* * * * *